(12) United States Patent
Czimmek

(10) Patent No.: US 6,702,250 B2
(45) Date of Patent: Mar. 9, 2004

(54) MAGNETOSTRICTIVE ELECTRONIC VALVE TIMING ACTUATOR

(75) Inventor: Perry Robert Czimmek, Williamsburg, VA (US)

(73) Assignee: Siemens Automotive Corporation, Auburn Hills, MI (US)

( * ) Notice: Subject to any disclaimer, the term of this patent is extended or adjusted under 35 U.S.C. 154(b) by 0 days.

(21) Appl. No.: 10/323,884

(22) Filed: Dec. 20, 2002

(65) Prior Publication Data

US 2003/0137376 A1 Jul. 24, 2003

Related U.S. Application Data

(62) Division of application No. 09/789,576, filed on Feb. 22, 2001, now Pat. No. 6,570,474.
(60) Provisional application No. 60/183,915, filed on Feb. 22, 2000.

(51) Int. Cl.[7] ............................ F02M 41/00; F16K 31/02
(52) U.S. Cl. .................. 251/129.06; 123/90.11; 123/90.12; 123/446; 335/215
(58) Field of Search ............ 123/90.11, 90.12, 123/446; 239/102.2, 585.1–585.5; 251/129.06

(56) References Cited

U.S. PATENT DOCUMENTS

| | | | |
|---|---|---|---|
| 3,753,426 A | 8/1973 | Lilley | 123/139 E |
| 4,499,878 A | 2/1985 | Igashira et al. | 123/478 |
| 4,529,164 A | 7/1985 | Igashira et al. | 251/129 |
| 4,550,744 A | 11/1985 | Igashira et al. | 137/80 |
| 4,553,059 A | 11/1985 | Abe et al. | 310/328 |
| 4,593,658 A | 6/1986 | Moloney | 123/90.11 |
| 4,608,958 A | 9/1986 | Sakakibara et al. | 123/605 |
| 4,649,886 A | 3/1987 | Igashira et al. | 123/498 |
| 4,725,002 A | 2/1988 | Trachte | 239/102.2 |
| 4,735,185 A | 4/1988 | Imoto et al. | 123/498 |
| 4,791,895 A | 12/1988 | Tittizer | 123/90.12 |
| 4,804,314 A | 2/1989 | Cusack | 417/322 |
| 5,036,821 A | 8/1991 | Horiuchi et al. | 123/506 |
| 5,080,079 A | 1/1992 | Yoshida et al. | 123/531 |
| 5,117,213 A | 5/1992 | Kreuter et al. | 335/219 |
| 5,176,122 A | 1/1993 | Ito | 123/478 |
| 5,209,453 A | 5/1993 | Aota et al. | 251/57 |
| 5,339,777 A | 8/1994 | Cannon | 123/90.12 |
| 5,605,134 A | 2/1997 | Martin | 123/467 |
| 5,673,658 A | 10/1997 | Allmendinger | 123/90.12 |
| 5,779,149 A | 7/1998 | Hayes, Jr. | 239/124 |
| 5,810,255 A | 9/1998 | Itoh et al. | 239/102.2 |
| 5,875,764 A * | 3/1999 | Kappel et al. | 123/467 |
| 6,006,720 A | 12/1999 | Yanagihara et al. | 123/305 |
| 6,026,771 A | 2/2000 | Escobosa | 123/90.12 |
| 6,062,533 A | 5/2000 | Kappei et al. | 251/57 |
| 6,079,636 A | 6/2000 | Rembold et al. | 239/88 |
| 6,142,443 A | 11/2000 | Potschin et al. | 251/57 |
| 6,148,842 A | 11/2000 | Kappel et al. | 137/79 |
| 6,168,133 B1 | 1/2001 | Heinz et al. | 251/57 |
| 6,213,414 B1 | 4/2001 | Stier et al. | 239/584 |
| 6,260,541 B1 | 7/2001 | Ricci-Ottati et al. | 123/498 |

* cited by examiner

*Primary Examiner*—Ramon M. Barrera

(57) ABSTRACT

An apparatus and method for actuating a valve using magnetostrictive transduction is provided. A ferro-magnetic rod having giant magnetostrictive properties is operatively coupled with a hydraulic chamber. Application of a magnetic field to the ferro-magnetic rod generates strain in the rod and corresponding movement in a first piston, causing the fluid in the hydraulic chamber to become pressurized. The pressurized fluid forces a second piston to move, thereby actuating the valve.

10 Claims, 6 Drawing Sheets

MAGNETOSTRICTIVE ELECTRONIC VALVE TIMING ACTUATOR

This application is a divisional of application Ser. No. 09/789,576 filed Feb. 22, 2001 now U.S. Pat. No. 6,570,474, and claims the benefit of U.S. Provisional Application No. 60/183,915 filed Feb. 22, 2000, which is hereby incorporated by reference in its entirety.

FIELD OF THE INVENTION

This invention relates to a high-speed electromagnetic actuator, and particularly to a electronic valve timing actuator for opening and closing the valves of an internal combustion engine. More particularly, this disclosure relates to an apparatus and method of actuating valves in an internal combustion engine by magnetostrictive transduction.

BACKGROUND OF THE INVENTION

A conventional method of actuating the valves of an internal combustion engine is by a mechanical camshaft-driven valve train. The camshaft has lobes on it that push against valve lifters or tappets as the camshaft rotates in synchronization with the crankshaft. The linear motion imparted to the lifters by the camshaft is then applied to actuate the valves, either directly or via push rod and rocker arm assemblies, at the appropriate times in the engine cycle.

A second method of actuating the valves of an internal combustion engine is by use of an electromagnetic actuator. This method of actuation uses an armature and stator configuration, wherein the armature may be connected directly or via a hydraulic lifter (i.e., tappet) to the valve stem. Energizing either the opening or closing stator pulls the armature, and therefore the valve, to the respective opened or closed valve position. Because of the large forces involved, it is desirable to provide a "soft landing" (i.e., near zero velocity landing) of the armature against the stator core to reduce wear and noise of the valve train. U.S. Pat. No. 5,991,143 to D. Wright and P. Czimmek, teaches a method of providing the above-described electromagnetic actuator with the characteristic of a soft landing using an electronic closed loop control system.

The conventional electronic valve timing actuator consists of an armature, one or more stators, and a solenoid coil for each stator that, when energized, provides the magnetomotive force that generates a magnetic force and causes the armature to move to an open or closed position. The point at which the armature, and therefore the valve, begins to move varies with the spring load in the system, the friction and inertia of the valve, the cylinder pressure, eddy currents, and the ability of the particular design to direct magnetic flux into the working gap. Essentially, the valve will not move until the magnetic force builds at a rate and to a level high enough to overcome the opposing forces and influences noted above. Likewise, until the magnetic force decays to a low enough level for the actuating spring to overcome the valve inertia and magnetic force, the valve will not return to its start position. In a conventional electronic valve timing actuator, once the valve begins opening or closing, it will continue to travel toward the opposite stator position until it impacts the respective end-stop, creating potentially severe wear and noise problems unless a closed loop control, such as described above, is utilized to accomplish a soft landing.

Accordingly, a need exists for an electronic valve timing actuator that can dynamically vary the absolute valve lift and the duration of the valve lift, while providing a soft landing without the need for external control circuitry. The ability to vary the absolute valve lift is absent from the above-described conventional electromagnetic actuator, whose fixed mechanical dimensions prevent dynamically varying the opening valve lift dimension.

One method of achieving controlled trajectory operation is by use of a piezoelectric transducer. Transducers convert energy from one form to another and the act of conversion is referred to as transduction. The piezoelectric effect is a form of transduction. A piezoelectric actuator consists of a stack of piezoceramic or piezocrystal wafers bonded together to form a piezostack transducer. Piezoelectric transducers convert energy in an electric field into a mechanical strain in the piezoelectric material. The piezostack may be attached to the mechanical member, such as a valve lifter or valve stem. When the piezostack has a high voltage potential applied across the wafers, the piezoelectric effect causes the stack to change dimension, thereby actuating the valve. An advantage of piezoelectric actuation is that the piezostack applies full force during the entire armature travel, allowing for controlled trajectory operation.

However, a piezoelectric actuator requires a complex high voltage driver with the capacity to slew hundreds of volts rapidly into a capacitive load while maintaining high voltage isolation. The following derivation explains why it is advantageous to utilize magnetostrictive transduction over electrostrictive transduction in most electronic valve timing applications. Comparing the energy densities in magnetic and electric fields, it can be shown that the energy density in a magnetic field is given by:

$B^2/2\mu$, where $\mu$=permeability of free space=$12.57 \times 10^{-7}$ Tm/A;

the energy density in an electric field is given by:

$\epsilon E^2/2$, where $\epsilon$=permittivity of free space=$8.85 \times 10^{-12}$ C/Nm$^2$; and thus the ratio of magnetic to electric energy densities=$B^2/\mu\epsilon E^2$.

Conservatively, the magnetic energy density is several orders of magnitude greater than the electric energy density, given that most ferromagnetic materials saturate above 1 Tesla (usually around 2 Tesla) and most dielectrics break down at above 100,000 Volts per mm (usually higher).

Accordingly, because magnetic energy density is several orders of magnitude greater than the electric energy density, piezoelectric (i.e., electrostrictive) transduction requires high voltages to generate a useful electric energy density and hence a useful strain in the piezoelectric material, e.g. on the order of approximately 200 volts. Thus, a need exists for an engine valve actuator capable of operating on the magnetic equivalent of the piezoelectric effect, i.e., magnetostriction.

The magnetostrictive electronic valve timing actuator disclosed herein provides the desired soft landing without the need of any external soft landing control circuitry. The term "magnetostriction" literally means magnetic contraction, but is generally understood to encompass the following similar effects associated with ferromagnetic materials: the Guillemin Effect, which is the tendency of a bent ferromagnetic rod to straighten in a longitudinal magnetic field; the Wiedemann Effect, which is the twisting of a rod carrying an electric current when placed in a magnetic field; the Joule Effect, which is a gradual increasing of length of a ferromagnetic rod when subjected to a gradual increasing longitudinal magnetic field; and the Villari Effect, which is a change of magnetic induction in the presence of a longitudinal magnetic field (Inverse Joule Effect).

The dimensional changes that occur when a ferromagnetic material is placed in a magnetic field are normally considered undesirable effects because of the need for dimensional stability in precision electromagnetic devices. Therefore, manufacturers of ferromagnetic alloys often formulate their alloys to exhibit very low magnetostriction effects. All ferromagnetic materials exhibit magnetic characteristics because of their ability to align magnetic domains. As shown in FIG. 1, strongly magnetostrictive materials characteristically have domains that are longer in the direction of their polarization (North/South) and narrower in a direction perpendicular to their polarization, thus allowing the domains to change the major dimensions of the ferromagnetic material when the domains rotate.

For example, the magnetostrictive alloy Terfenol-D ($Tb_{0.32}Dy_{0.68}Fe_{1.92}$), is capable of approximately 10 um displacements for every 1 cm of length that is exposed to an approximately 500 Oersted magnetizing field. The general equation for magnetizing force, H, in Ampere-Turns per meter (1 Oersted=79.6 AT/m) is:

H=IN/L; where I=Amperes of current, N=number of turns, and L=path length.

Terfenol-D is often referred to as a "smart material" because of its ability to respond to its environment and exhibit giant magnetostrictive properties. As depicted in FIG. 2, the magnetostrictive response is described by the following equation:

S=dH; where S=strain, d=slope of strain-magnetization curve, and

H=magnetic field intensity.

While the present invention will be described primarily with reference to Terfenol-D as a preferred magnetostrictive material, it will be appreciated by those skilled in the art that other alloys having similar magnetostrictive properties may be substituted and are included within the scope of the present invention.

SUMMARY OF THE INVENTION

A magnetostrictive valve actuator is provided. The magnetostrictive actuator has a body having a first cavity and a second cavity, the first cavity having a distal end and a proximal end forming a longitudinal axis. The second cavity forms a hydraulic chamber in communication with the first cavity via a first bore having a first sealing diameter. A first piston is sealably positioned in the first bore, the first piston being displaceable in the direction of the longitudinal axis. A second bore is provided having a second sealing diameter, the second bore being in communication with the hydraulic chamber. A second piston is sealably positioned in the second bore, the second piston being displaceable within the second bore in response to changes in hydraulic pressure within the hydraulic chamber. A magnetostrictive member having a predetermined length is disposed substantially in the direction of the longitudinal axis of the first cavity, the magnetostrictive member being in operative contact with the first piston. A coil for generating a magnetic field is disposed proximate the magnetostrictive element such that magnetic flux passes through the magnetostrictive element upon excitation of the coil, causing the predetermined length to increase, forcing the first piston to be displaced toward the hydraulic chamber and the second piston to move under the influence of the hydraulic pressure created by the displacement of the first piston.

A method of actuating a valve in an internal combustion engine is also provided. The method includes locating a coil for generating a magnetic field proximate a magnetostrictive element having a predetermined length, such that magnetic flux passes through the magnetostrictive element upon excitation of the coil, causing the predetermined length to increase and forcing a first piston to be displaced toward a hydraulic chamber and a second piston to move under the influence of the hydraulic pressure created by the displacement of the first piston.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention.

DETAILED DESCRIPTION OF THE PREFERRED EMBODIMENT(S)

The presently preferred embodiments will be described primarily in relation to magnetostrictive electronic valve actuators. However, as will be appreciated by those skilled in the art, these embodiments are not so limited and may be used in any application where a high-force, soft landing actuator is desired.

The presently preferred embodiments overcome many of the limitations of conventional camshaft-based valve actuators, and the electro-mechanical electronic valve timing actuators described above, by providing a magnetostrictive valve actuator, whose normal operating mode provides a soft landing trajectory that enables precise control of valve timing, and the ability to provide continuously variable valve lift and variable valve timing. The magnetostrictive actuator according to presently preferred embodiments further provides large forces at small lifts, much like a conventional cam valve train, allowing the opening of exhaust valves under high exhaust backpressure.

Figure 1:
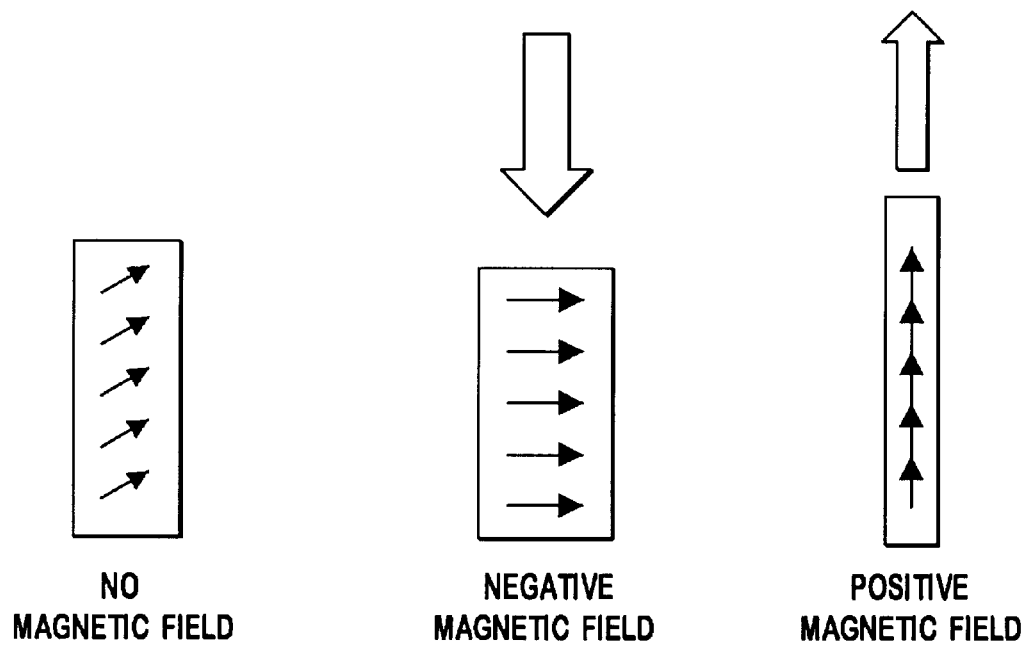
FIG. 1 is a sectional view of a magnetostrictive material illustrating the effect of an externally applied magnetic field on the orientation of magnetic domains within the material, and the corresponding effect on the outer dimensions of the material.
Figure 2:
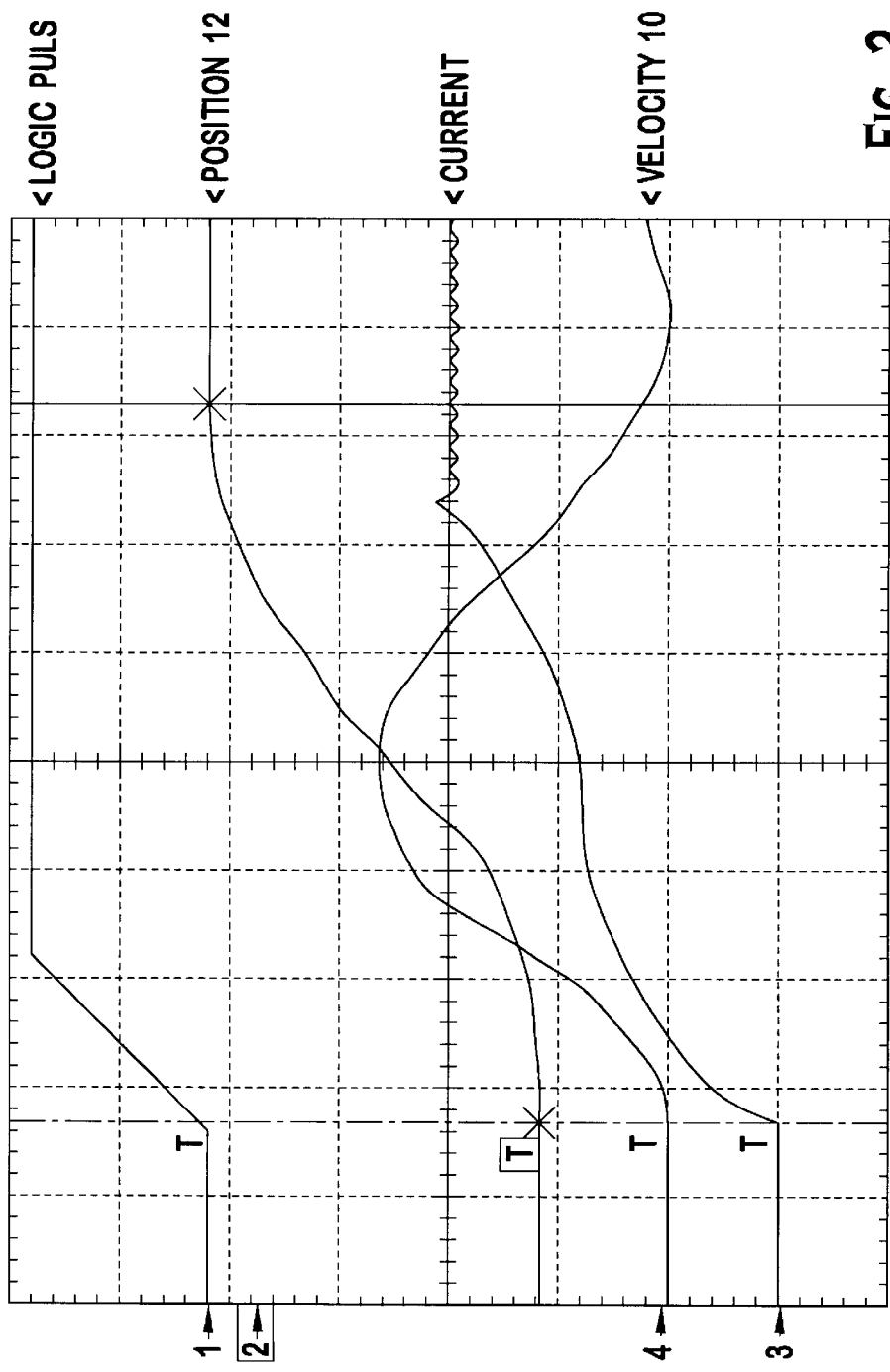
FIG. 2 illustrates a soft landing trajectory response of a magnetostrictive actuator in accordance with the principles of the present invention.

FIG. 2 depicts a soft landing trajectory response of a magnetostrictive actuator in accordance with a presently preferred embodiment. The soft landing characteristic may be readily identified by the near-zero velocity 10 of the actuator at the extremes of position 12.

Figure 3:
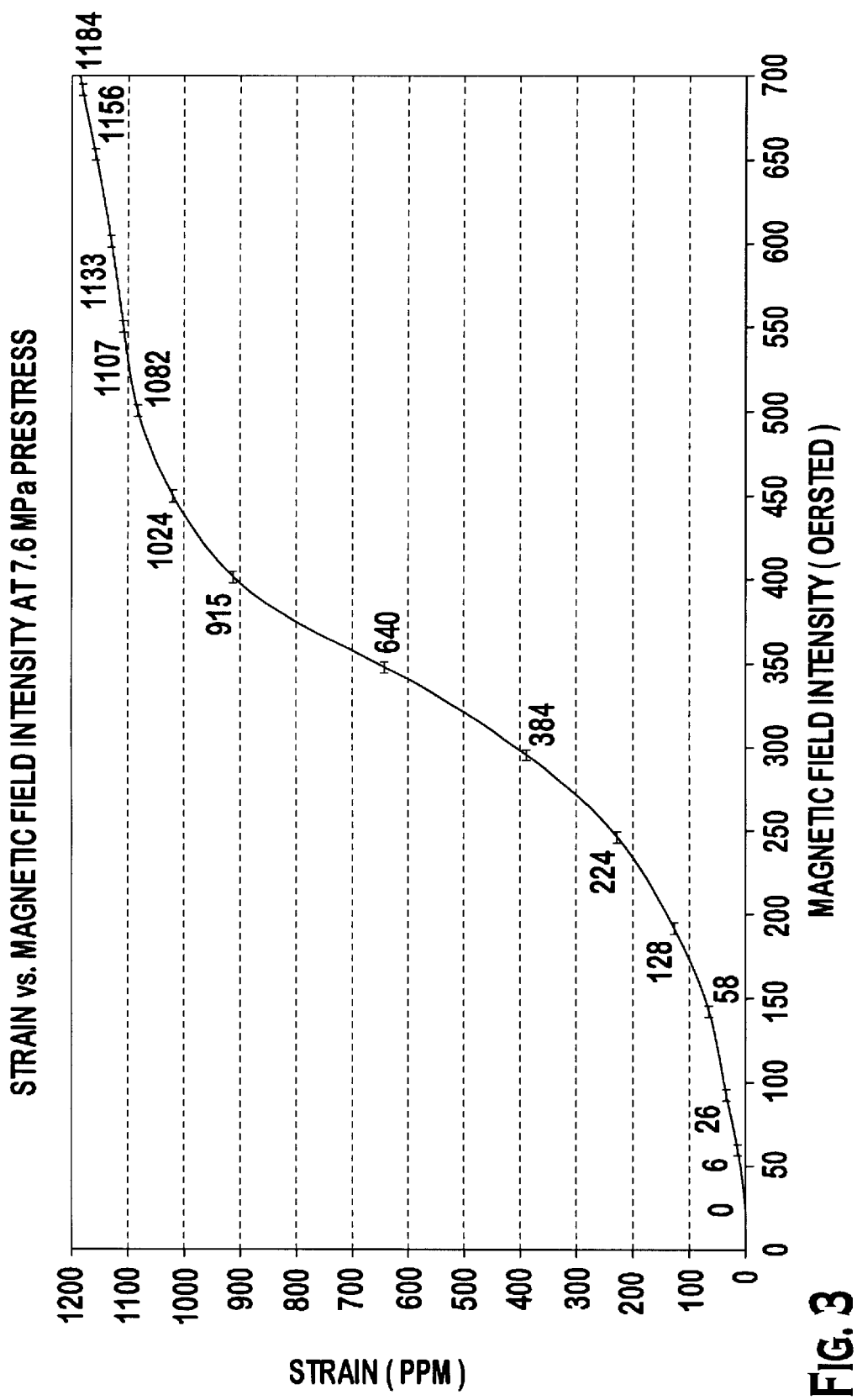
FIG. 3 illustrates the relationship between strain and magnetic filed intensity for a magnetostrictive rod under prestress in accordance with a preferred embodiment of the present invention.

FIG. 3 depicts the strain versus magnetic field intensity for a magnetostrictive rod under a preload. The ability of a magnetostrictive electronic valve timing actuator, as disclosed herein, to provide a soft landing may be observed graphically from the decreasing rate of increase of strain depicted in FIG. 3 in the range above the "burst region" of the graph (i.e., above about 500 Oersted).

Figure 4:
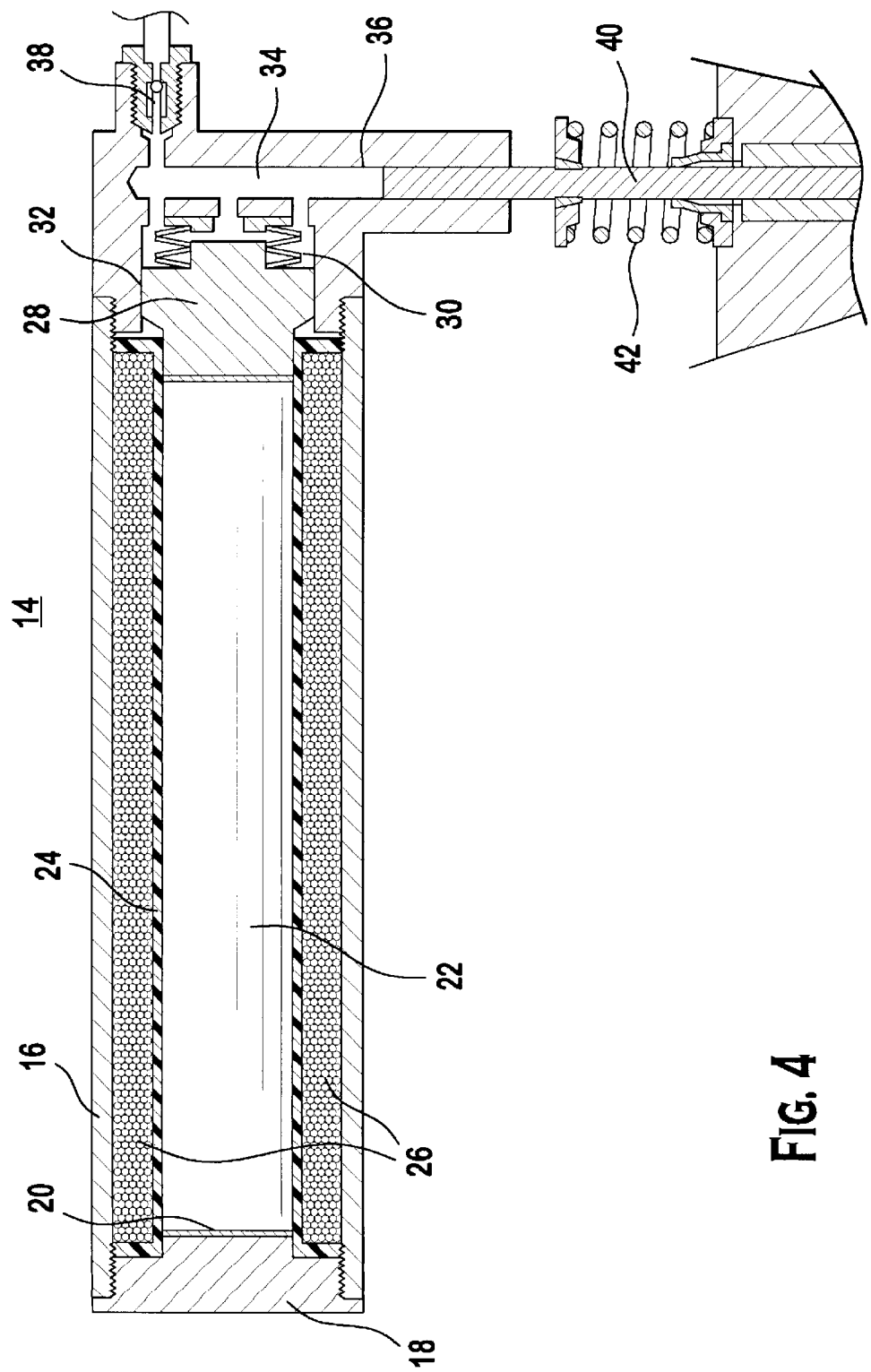
FIG. 4 is sectional view of a magnetostrictive electronic valve actuator in accordance with a preferred embodiment of the present invention.
Figure 5:
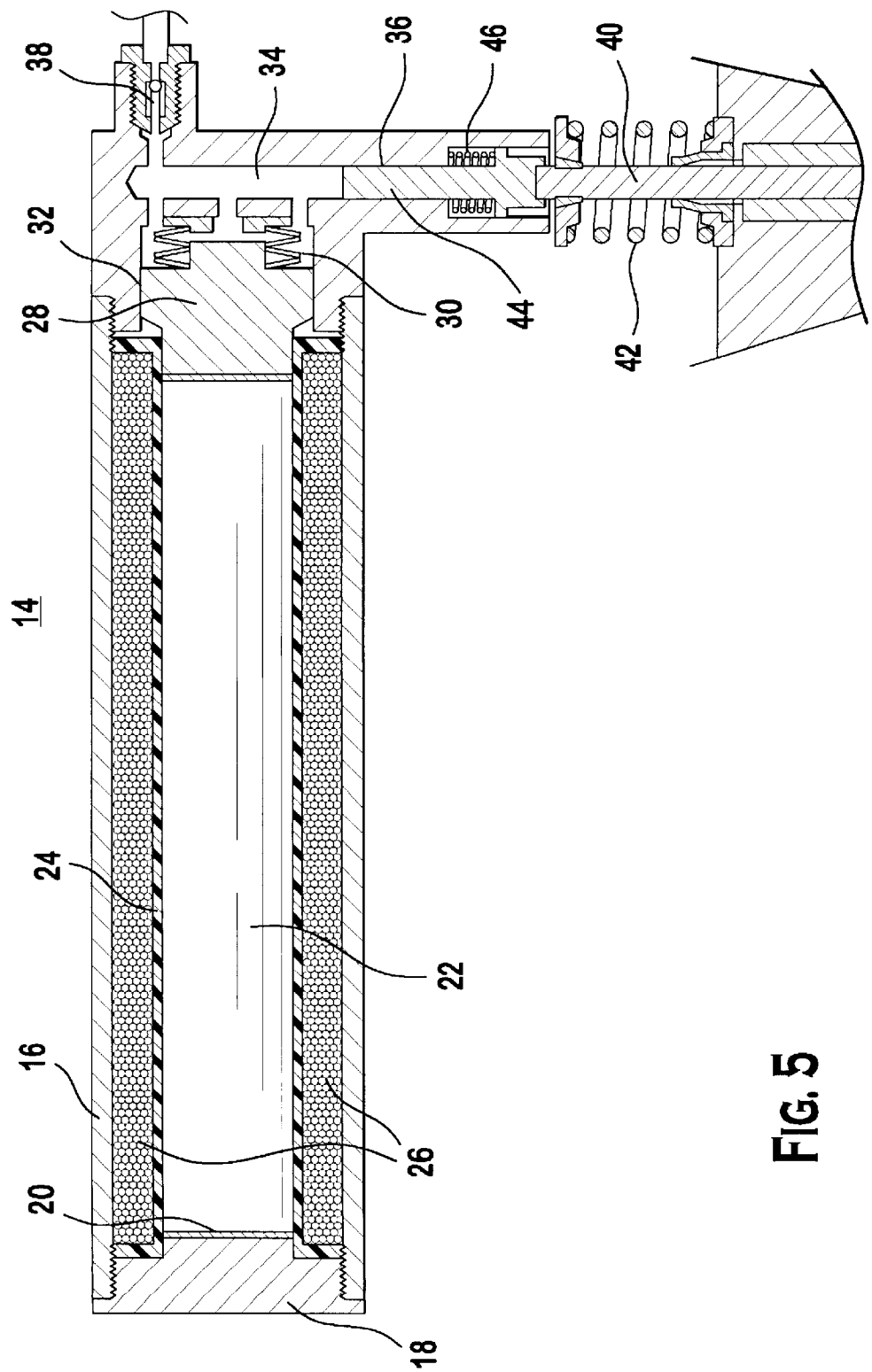
FIG. 5 is sectional view of a magnetostrictive electronic valve actuator in accordance with a preferred embodiment of the present invention.
Figure 6:
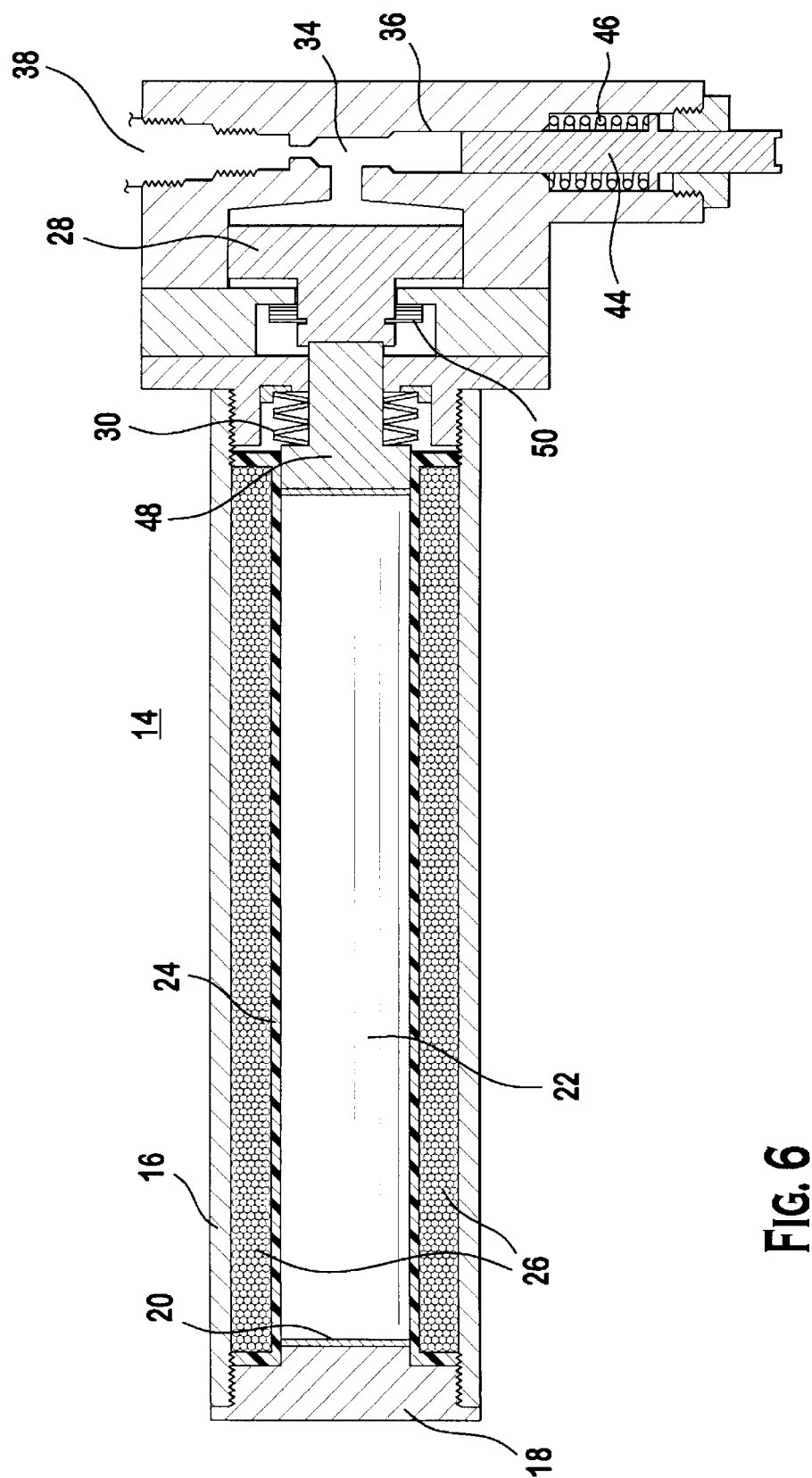
FIG. 6 is sectional view of a magnetostrictive electronic valve actuator in accordance with a preferred embodiment of the present invention.

FIGS. 4–6 illustrate magnetostrictive electronic valve timing actuators in accordance with presently preferred embodiments. The magnetostrictive electronic valve timing actuators depicted in FIGS. 4–6 comprise a steel cylindrical housing 16 having an outside diameter of approximately 50 mm. A threaded magnetic steel end cap 18 at the distal end of the cylindrical housing 16 supports a soft steel shim 20. A magnetostrictive member 22 is coaxially positioned within both the housing 16 and a cylindrical polymer bobbin 24, such that the distal end of the magnetostrictive member is in contact with the soft steel shim 20. In a preferred embodiment, the polymer coil bobbin 24 has an outside diameter of approximately 28 mm. In the preferred embodiments depicted in FIGS. 4 and 5, the polymer coil bobbin 24 has a coil area 26 having approximately 1550 turns of #20 AWG wire. In the preferred embodiment depicted in FIG. 6, the polymer coil bobbin 24 has a coil area 26 having approximately 1560 turns of #18 AWG wire.

Referring to FIGS. 4–5, a hardened magnetic steel piston 28 is moveably positioned at the proximal end of the magnetostrictive member 22 within a bore having a large sealing diameter 32 in the steel case 16. Return disc spring 30 urges the hardened magnetic steel piston 28 into contact with the proximal end of the magnetostrictive member 22, thereby exerting a preload on the magnetostrictive member 22. A hydraulic volume 34 is formed within the steel case in communication with the distal end of the hardened magnetic steel piston 28 and a bore having a narrow sealing diameter 36. A check valve 38 provides a hydraulic oil feed to the hydraulic volume 34.

According to the preferred embodiment depicted in FIG. 4, a lengthened valve stem 40 is positioned within the bore having a narrow sealing diameter 36, such that when the hardened magnetic steel piston 28 moves under the force exerted by the magnetostrictive member 22, a volume of hydraulic fluid is displaced, forcing the valve 40 toward an open position in opposition to the force exerted by the valve spring 42.

According to the preferred embodiment depicted in FIG. 5, a second steel piston 44 having a return spring 46 is positioned within the bore having a narrow sealing diameter 36. In operation, when the hardened magnetic steel piston 28 moves under the force exerted by the magnetostrictive member 22, a volume of hydraulic fluid is displaced, forcing the second steel piston 44 toward the valve 40 and causing it to move toward an open position in opposition to the force exerted by the valve spring 42.

According to the preferred embodiment depicted in FIG. 6, an intermediate steel plunger 48 is moveably positioned at the proximal end of the magnetostrictive member 22 within a bore in the steel case 16. Return disc spring 30 urges the intermediate steel plunger 48 into contact with the proximal end of the magnetostrictive member 22, thereby exerting a preload on the magnetostrictive member 22. The distal end of the steel plunger 48 is in contact with a hardened magnetic steel piston 28 which is moveably positioned within a bore having a large sealing diameter 32 in the steel case 16. In operation, when the steel plunger 48 moves under the force exerted by the magnetostrictive member 22, it exerts a force on the hardened magnetic steel piston 28, which in-turn displaces a volume of hydraulic fluid, forcing the second steel piston 44 toward the valve 40 and causing it to move toward an open position in opposition to the force exerted by the valve spring 42. A volume of hydraulic fluid is thereby displaced, forcing the second steel piston 44 toward the valve (not shown) and causing it to move toward an open position in opposition to the force exerted by the valve spring (not shown).

Accordingly, a presently preferred embodiment further provides a method of actuating a valve using the principle of magnetostrictive transduction by the incorporation of a magnetostrictive member 22 (e.g., a Terfenol-D rod) in an electronic valve timing actuator 14. The magnetostrictive member 22 may be used to drive an integral hydraulic piston of a large sealing diameter 28 to move a hydraulic volume 34 from the large sealing diameter chamber 32 to a small sealing diameter chamber 36, therefore driving a small sealing diameter hydraulic piston 44 (or lengthened valve stem 40).

The ratio of the area of the large sealing diameter 32 to the small sealing diameter 36 determines the displacement gain from the magnetostrictive member 22 to the valve. For example, if the magnetostrictive member 22 displaced a large piston 28 160 microns and the small piston 44 had an area 50 times smaller than the large piston 28 (as depicted in FIGS. 4 and 5), the displacement of the small piston 44, and therefore the valve 40, would be approximately 8 mm. The movement of a fluid in a hydraulic volume 34 enables a designer to easily adjust the displacement gain to accommodate applications with a wide variety of magnetostrictive displacement capabilities.

Providing the hydraulic coupling between the magnetostrictive member 22 and the valve 40, as depicted in FIGS. 4–6, also offers the benefit of compensating for thermal expansion and tolerance stack up, similar to the hydraulic coupling performed by a typical hydraulic lifter (tappet) in a conventional cam driven valve train or conventional electromagnetic valve timing actuator. The check valve 38 of the magnetostrictive actuator serves a similar function as the check valve in a hydraulic lifter, allowing the pumping up of the hydraulic volume by the engine oil pressure, thereby removing valve lash when the engine valve is in a closed position. According to a presently preferred embodiment, the default closed position of the engine valve 40 may be aided by a conventional valve spring 42.

According to a presently preferred embodiment, the magnetostrictive member should be prestressed to a nominal value (i.e., about 7.6 MPa for Terfenol-D) to maximize magnetostriction. This prestress may be provided by high spring rate disc springs 30 (e.g., chrome-vanadium steel belleville springs) chosen and stressed to optimize their cycle life. According to the embodiment depicted in FIG. 6, the prestress springs may impinge upon a plunger 48 (loaded to about 700 Newtons for a 25 mm diameter Terfenol-D rod) at the moving end of the magnetostrictive rod 22, thereby coupling to the large sealing diameter piston, which may be loaded in the direction of the plunger via a finger spring 50 (loaded to about 40 Newtons). The embodiments depicted in FIGS. 4 and 5, respectively, place the disk springs 30 inside the hydraulic chamber and combine the plunger 48 and large sealing diameter piston 28 into one unit. This configuration decreases the number of parts required, omits the finger spring 50 and provides cooling and lubrication for the disc springs 30 via immersion in engine oil.

The primary design parameters requiring consideration in incorporating magnetic transduction in an electronic valve timing actuator will now be described. In selecting a particular magnetostrictive material, the designer should consider the geometry of the application, the initial domain alignment in relation to magnetizing field direction, grain orientations, grain sizes, which strongly influence the magnetic characteristics in silicon-irons or nickel-irons, and the desired magnitude of displacement and displacement direction. For example, Terfenol-D can be had in varying grades of quality and with different initial domain orientations. A presently preferred orientation of domain polarity will allow for a positive longitudinal magnetic field to provide maximum strains in a longitudinal direction, thus lengthening the magnetostrictive member.

The prestress, as well as its direction to domain orientation, should also be considered by the designer. Some prestress opposing the desired member, such as a slight compression by a disc or coil spring in the direction of holding the valve closed displacement is preferred, and will result in greater valve displacement when the magnetizing force is applied. Of course the prestress should not be so great as to overwhelm the displacement of the magnetostrictive material.

The solenoid coil around the magnetostrictive rod should be chosen to have dimensions and wire size appropriate to maximize coupling to the rod while having a coil L/R time constant appropriate to get the valve opened and closed within the desired duration. The magnetization force, and therefore the amount of stretching of the magnetostrictive member, is determined primarily by the coil current and number of coil turns. The number of coil turns may be calculated or experimentally determined for a given design. The maximum level of the coil current may also be varied to adjust lift. However, the coil current should be maintained within a reasonable range that would avoid saturating the magnetostrictive material or dissipating excessive power in the coil. In a preferred embodiment, the current can be varied by an external driver or determined from the operating voltage and coil resistance.

In a presently preferred embodiment, a wire size of #18 AWG to #20 AWG (0.86 mm to 1.07 mm diameter with insulation) may be wound, preferably over 1500 turns of turns, to form the coil bobbin 24. With a current of about 4.5 amps this configuration provides about 7,000 ampere-turns for about a 500 Oersted magnetic field intensity. The resulting coil inductance of this configuration will be about between 43 and 46 mH and the coil resistance will be about 3.4 to 5 ohms, providing a time constant which permits opening an engine valve in less than approximately 5 milliseconds with a 42 volt system or less than 2.5 milliseconds with an 80 volt boost. Lower valve lifts can be attained in shorter times and many other combinations of coil wire sizes, number of turns, voltages and currents may be used.

Magnetostrictive strain and prestress should also be considered in the member geometry so as not to surpass the yield stress of the material. For Terfenol-D, a compressive prestress increases the total strain capability of the material by more than the initial compressive strain. Terfenol-D has a tensile strength of less than 30 MPa and a compressive strength of greater than 600 MPa. Therefore, there are application-specific tradeoffs in design complexity, size and displacement based on a balance of desired displacement, force and prestress of the magnetostrictive member.

A Terfenol-D magnetostrictive rod has a normal temperature range of −40 C to +360 C and exhibits decreasing magnetostriction at the temperature extremes. Therefore consideration must be given to the desired operational temperature range. Terfenol-D is otherwise stable below its melting point of +1250 C and has no apparent cycle life degradation of performance, even with overstress up to about 600 MPa. In a preferred embodiment, thermal compensation and lift at various current levels of the magnetostrictive member can be mapped and compensated for in the engine controller. Real-time temperature measurements can be incorporated by using a thermocouple at the magnetostrictive rod or by measuring coil resistance change due to temperature.

Further compensation for degradation in lift as temperature increases can be achieved by use of a temperature compensating component, such as a thermistor, which can be incorporated in the current regulator to trim the current to higher values as the temperature increases. As the temperature rises, a desired lift may be maintained by increasing the current, and thus increasing the magnetization force to adjust for the decreased gain of the magnetostrictive transduction effect. In a preferred embodiment, careful selection of the thermistor resistance slope over the desired temperature range may result in a nearly perfect cancellation of the slope of magnetostrictive degradation due to temperature, thus enabling a constant lift to be maintained over the entire operating temperature range of the magnetostrictive actuator. A similar thermistor trim may be used to compensate for lift changes due to dimensional changes in the actuator housing components caused by thermal variations.

By having an actuator that operates with a current level directly proportional to lift and provides a soft landing without the need for external control circuitry, overall system cost can be reduced over other electronic valve timing systems while gaining the variable valve timing and variable valve lift capability and not losing the force performance of a cam driven valve train.

While the present invention has been disclosed with reference to certain preferred embodiments, numerous modifications, alterations, and changes to the described embodiments are possible without departing from the sphere and scope of the present invention, as defined in the appended claims. Accordingly, it is intended that the present invention not be limited to the described embodiments, but have the full scope defined by the language of the following claims, and equivalents thereof.

What I claim is:

1. A magnetostrictive valve actuator comprising:
   a body having a first cavity and a second cavity, the first cavity having a distal end and a proximal end extending along a longitudinal axis and the second cavity forming a hydraulic chamber in communication with the first cavity via a first bore having a first sealing diameter;
   a first piston positioned in the first bore, the first piston being displaceable in the direction of the longitudinal axis;
   a second bore having a second sealing diameter, the second bore being in communication with the hydraulic chamber;
   a second piston positioned in the second bore, the second piston being displaceable with in the second bore in response to changes in hydraulic pressure within the hydraulic chamber;
   a magnetostrictive member having a predetermined length disposed substantially in the direction of the longitudinal axis of the first cavity, the magnetostrictive member being in operative contact with the first piston;
   an adjustable member coupled to the housing, the adjustable member engaging one end of the magnetostrictive member distal to the first piston;
   a coil that generates a magnetic field disposed proximate the magnetostrictive member such that magnetic flux passes through the magnetostrictive member upon excitation of the coil, causing the predetermined length to increase, forcing the first piston to be displace toward the hydraulic chamber and the second piston to move under the influence of the hydraulic pressure created by the displacement of the first piston; and biasing means disposed in a third bore and operatively arranged to exert a predetermined prestress force on the magnetostrictive member.

2. A magnetostrictive valve actuator comprising:

a body having a first cavity and a second cavity, the first cavity having a distal end and a proximal end extending along a longitudinal axis and the second cavity forming a hydraulic chamber in communication with the first cavity via a first bore having a first sealing diameter;

a first piston positioned in the first bore, the first piston being displaceable in the direction of the longitudinal axis;

a second bore having a second sealing diameter, the second bore being in communication with the hydraulic chamber;

a second piston positioned in the second bore, the second piston being displaceable with in the second bore in response to changes in hydraulic pressure within the hydraulic chamber;

a magnetostrictive member having a predetermined length disposed substantially in the direction of the longitudinal axis of the first cavity, the magnetostrictive member being in operative contact with the first piston;

a coil that generates a magnetic field disposed proximate the magnetostrictive member such that magnetic flux passes through the magnetostrictive member upon excitation of the coil, causing the predetermined length to increase, forcing the first piston to be displace toward the hydraulic chamber and the second piston to move under the influence of the hydraulic pressure created by the displacement of the first piston; and biasing means disposed in a third bore and operatively arranged to exert a predetermined prestress force on the magnetostrictive member, wherein the prestress force is in the range of 5–15 MPa.

3. The magnetostrictive valve actuator of claim 2, wherein the prestress force is 7.6 MPa.

4. A magnetostrictive valve actuator comprising:

a body having a first cavity and a second cavity, the first cavity having inner surfaces, a distal end and a proximal end extending along a longitudinal axis and the second cavity forming a hydraulic chamber in communication with the first cavity via a first bore having a first sealing diameter;

a first piston positioned in the first bore, the first piston being displaceable in the direction of the longitudinal axis;

a second bore having a second sealing diameter, the second bore being in communication with the hydraulic chamber;

a second piston positioned in the second bore, the second piston being displaceable with in the second bore in response to changes in hydraulic pressure within the hydraulic chamber;

a magnetostrictive member having a predetermined length disposed substantially in the direction of the longitudinal axis of the first cavity, the magnetostrictive member being in operative contact with the first piston;

a cap coupled to the housing, the cap engaging one end of the magnetostrictive member distal to the first piston;

a coil-that generates a magnetic field disposed proximate the magnetostrictive member such that magnetic flux passes through the magnetostrictive member upon excitation of the coil, causing the predetermined length to increase, forcing the first piston to be displace toward the hydraulic chamber and the second piston to move under the influence of the hydraulic pressure created by the displacement of the first piston; and a plunger being coupled to the magnetostrictive member, the plunger being disposed in a third bore.

5. A method of actuating a valve in an internal combustion engine, the method comprising:

locating a coil that generates a magnetic field proximate a magnetostrictive member having a predetermined length, such that magnetic flux passes through the magnetostrictive member upon excitation of the coil, causing the predetermined light to increase and forcing a first piston to be displaced toward a hydraulic chamber and a second piston to move under the influence of the hydraulic pressure created by the displacement of the first piston;

forming a body having a first cavity and a second cavity, the first cavity having a distal end and proximal end forming a longitudinal axis oblique to the second cavity, the second cavity forming the hydraulic chamber in communication with the first cavity via a first bore having a first sealing diameter, positioning the first piston in the first bore, the first piston being displaceable in the direction of the longitudinal axis;

forming a second bore having a second sealing diameter the second bore being in communication with the hydraulic chamber;

positioning the second piston in the second bore, the second piston being displaceable within the second bore in response to changes in hydraulic pressure within the hydraulic chamber;

placing the magnetostrictive member substantially in the direction of the longitudinal axis of the first cavity, the magnetostrictive member being in operative contact with the first piston;

engaging one end of the magnetostrictive member distal to the first piston with an adjustable member; and locating biasing means in a third bore, the biasing means operative to provide a prestress force on the magnetostrictive member.

6. The method as claimed in claim 5, wherein the locating further comprising locating a plunger in the third bore.

7. A method of reciprocating a valve between first and second positions with an actuator having a housing extending along a longitudinal axis between a first end and second end, the housing enclosing a coil coaxial with a magnetostrictive member having first and second magnetostrictive ends, a first piston coupled to one of the first and second magnetostrictive ends, the first piston having a spring that applies a spring force against the first piston to provide a preload on the magnetostrictive member, the first piston being coupled by fluid to a second piston connected to the valve, the method comprising:

coupling an adjustable member to the other end of the magnetostrictive member so that the member adjusts the preload on the magnetostrictive member; and energizing the coil so that the magnetostrictive member moves the valve between one of the first and second positions via the first and second pistons.

8. The method of claim 7, wherein the coupling comprises threading the adjustable member against a shim disposed between the adjustable member and the magnetostrictive actuator so that the first piston and spring provide a pressure upon the magnetostrictive member to about 7.6 MegaPascal prior to energization of the coil.

9. The method of claim 8, wherein the energizing comprises generating a magnetic field intensity of about 500 Oersted.

10. The method of claim 9, wherein the energizing comprises applying a voltage of about 40 volts to the coil so that the valve is moved from the first to the second position over a distance of about 8 millimeters in less than 5 milliseconds.

* * * * *